(12) United States Patent
Xu

(10) Patent No.: US 10,965,590 B2
(45) Date of Patent: *Mar. 30, 2021

(54) PACKET PROCESSING METHOD AND ROUTER

(71) Applicant: Huawei Technologies Co., Ltd., Shenzhen (CN)

(72) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,146

(22) Filed: Jun. 14, 2019

(65) Prior Publication Data

US 2019/0297009 A1 Sep. 26, 2019

Related U.S. Application Data

(63) Continuation of application No. 15/910,865, filed on Mar. 2, 2018, now Pat. No. 10,326,693, which is a
(Continued)

(30) Foreign Application Priority Data

Jun. 8, 2013 (CN) .......................... 201310227560.6

(51) Int. Cl.
*H04L 12/723* (2013.01)
*H04L 12/721* (2013.01)
(Continued)

(52) U.S. Cl.
CPC .......... *H04L 45/50* (2013.01); *H04L 12/4633* (2013.01); *H04L 12/6418* (2013.01);
(Continued)

(58) Field of Classification Search
CPC ....... H04L 45/50; H04L 45/583; H04L 45/74; H04L 47/825; H04L 45/32; H04L 12/6418; H04L 12/4633
See application file for complete search history.

(56) References Cited

U.S. PATENT DOCUMENTS

| | | | |
|---|---|---|---|
| 2009/0182894 A1* | 7/2009 | Vasseur | ................... H04L 45/02 709/239 |
| 2011/0164503 A1 | 7/2011 | Yong et al. | |
| 2012/0069745 A1 | 3/2012 | Kini et al. | |

FOREIGN PATENT DOCUMENTS

| | | |
|---|---|---|
| CN | 101155115 A | 4/2008 |
| CN | 101656740 A | 2/2010 |
| CN | 103098426 A | 5/2013 |

OTHER PUBLICATIONS

Singh et al., Entropy label for seamless MPLS, Feb. 18, 2013, MPLS Working Group, Internet-draft. (Year: 2013).*

(Continued)

*Primary Examiner* — Shailendra Kumar
(74) *Attorney, Agent, or Firm* — Slater Matsil, LLP

(57) ABSTRACT

This application discloses a packet processing method and an LSR. The method includes: receiving, by an Ingress LSR of a first MPLS tunnel, a first notification packet that is based on an IGP, where the first notification packet includes an ELC flag, which is used to indicate that the first Egress LSR has ELC; after learning from the first notification packet that the first Egress LSR has ELC, inserting a label into a first packet, to generate a second packet, where the label forms an MPLS label stack, which includes, from bottom to top, a first EL, a first ELI, and a first TL; and sending the second packet to the first Egress LSR through the first MPLS tunnel. According to the solutions of this invention, a Transit LSR of the first MPLS tunnel may perform load balancing when forwarding the second packet.

18 Claims, 5 Drawing Sheets

Related U.S. Application Data continuation of application No. 14/960,971, filed on Dec. 7, 2015, now Pat. No. 9,942,136, which is a continuation of application No. PCT/CN2014/077659, filed on May 16, 2014.

(51) Int. Cl.
*H04L 12/775* (2013.01)
*H04L 12/741* (2013.01)
*H04L 12/911* (2013.01)
*H04L 12/64* (2006.01)
*H04L 12/46* (2006.01)

(52) U.S. Cl.
CPC ............ *H04L 45/32* (2013.01); *H04L 45/583* (2013.01); *H04L 45/74* (2013.01); *H04L 47/825* (2013.01)

(56) References Cited

OTHER PUBLICATIONS

Kompella et al., The Use of Entropy Labels in MPLS Forwarding, Nov. 2012, IETF RFC 6790. (Year: 2012).*
Le Roux et al., IS-IS Protocol Extensions for Path Computation Element (PCE) Discovery, Oct. 2007, Network Working Group, Internet-draft. RFC 5089 (Year: 2007).*
Le Roux et al., OSPF Protocol Extensions for Path Computation Element (PCE) Discovery, Jan. 2008, Network Working Group, RFC 5088. (Year: 2008).*
"Border Gateway Protocol," From Wikipedia, the free encyclopedia, https://en.wikipedia.org/wiki/Border_Gateway_Protocol, Downloaded Jan. 19, 2017, 16 pages.
Kini, S. et al., "Entropy Labels for Source Routed Tunnels with Label Stacks draft-ietf-mpls-spring-entropy-label-02," Network Working Group, Internet Draft, Intended Status: Standards Track, Expires: Jul. 29, 2016, Jan. 26, 2016, 11 pages.
Kini, S. et al., "Entropy Labels for Source Routed Stacked Tunnels draft-kini-mpls-spring-entropy-label-00," Network Working Group, Internet-Draft, Intended Status: Informational, Expires: Aug. 18, 2014, Feb. 14, 2014, 8 pages.
Filsfils, C. et al., "Segment Routing Architecture draft-ietf-spring-segment-routing-00," Network Working Group, Internet Draft, Intended Status: Standards Track, Expires May 28, 2015, Nov. 24, 2014, 18 pages.
"Interior Gateway Protocol," From Wikipedia, the free encyclopedia, https://en.wikipedia.org/wiki/Interior_gateway_protocol, downloaded Jan. 19, 2017, 2 pages.
Kini, S. et al., "Entropy Labels for Source Routed Stacked Tunnels draft-kini-mpls-entropy-label-src-stacked-tunnels-00," Network Working Group, Internet-Draft, Intended Status: Informational, Expires: Feb. 20, 2014, Aug. 19, 2013, 6 pages.
Kini, S. et al., "Entropy Labels with Deep Label Stacks (e.g. SPRING)," draft-kini-mpls-entropy-label-src-stacked-tunnels-01, IETF 88, Vancouver, Nov. 308, 2013, 9 pages.
Kompella, K. et al., "The Use of Entropy Labels in MPLS Forwarding," Internet Engineering Task Force (IETF), Request for Comments: 6790, Updates: 3031, 3107, 3209 and 5036, Category: Standards Track, ISSN 2070-1721, Nov. 2012, 25 pages.
Le Roux, J.L. et al., "IS-IS Protocol Extensions for Path Computation Element (PCE) Discovery," Network Working Group, Request for Comments: 5089, Category: Standards Track, Jan. 2008, 17 pages.
Le Roux, J.L. et al., "OSPF Protocol Extensions for Path Computation Element (PCE) Discovery," Network Working Group, Request for Comments: 5088, Category: Standards Track, Jan. 2008, 20 pages.
Li, T. et al., "IS-IS Extensions for Traffic Engineering," Network Working Group, Request for Comments: 5305, Obsoletes: 3784, Category: Standards Track, Oct. 2008, 17 pages.
Previdi, S. et al., "Segment Routing with IS-IS Routing Protocol draft-previdi-filsfils-isis-segment-routing-02," IS-IS for IP Internets, Internet-Draft, Intended status: Standards Track, Expires: Sep. 21, 2013, Mar. 20, 2013, 27 pages.
Singh, R. et al., "Entropy Label for Seamless MPLS draft-ravisingh-mpls-el-for-seamless-mpls-00," MPLS Working Group, Internet-Draft, Intended Status: Proposed Standard, Expires: Aug. 22, 2013, Feb. 18, 2013, 21 pages.
Xu. X. et al., "Signaling Entropy Label Capability Using IS-IS draft-xu-isis-mpls-elc-00," Network Working Group, Internet-Draft, Intended Status: Standards Track, Expires: Jun. 18, 2014, Dec. 18, 2013, 4 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Type         | Length        |         Value         |
+-+-+-+-+-+-+-+-+-+-+-+-+-+-+-+-+-+-+-+-+-+-+-+-+-+-+-+-+-+-+-+-+
```

PACKET PROCESSING METHOD AND ROUTER

CROSS-REFERENCE TO RELATED APPLICATIONS

This application is a continuation of U.S. patent application Ser. No. 15/910,865, filed on Mar. 2, 2018, which is a continuation of U.S. patent application Ser. No. 14/960,971, filed on Dec. 7, 2015, which is a continuation of International Patent Application No. PCT/CN2014/077659, filed on May 16, 2014, which claims priority to Chinese Patent Application No. 201310227560.6, filed on Jun. 8, 2013. The afore-mentioned patent applications are hereby incorporated by reference in their entireties.

TECHNICAL FIELD

Embodiments of the present invention relate to the field of communications technologies, and in particular, to a packet processing method and a router.

BACKGROUND

In a Segment Routing (SR) technology, a control plane uses an Interior Gateway Protocol (IGP) based on a link state, such as the Intermediate System to Intermediate System (IS-IS) protocol or the Open Shortest Path First (OSPF) protocol to transfer a Multiprotocol Label Switching (MPLS) Tunnel Label (TL) that is of a Label Switching Router (LSR) and has global significance, and a data plane forwards an MPLS packet based on the TL that is sent by the control plane and has global significance. Compared with an existing MPLS technology system, the segment routing technology simplifies operation, maintenance, and management of an MPLS network, and an existing label advertisement protocol such as the Label Distribution Protocol (LDP), the Resource Reservation Protocol-Traffic Engineering (RSVP-TE), or the Border Gateway Protocol (BGP) is not required in an SR network.

An Entropy Label (EL) technology is a method for implementing a load balancing capability of an MPLS network, and a basic idea is as follows: An ingress (Ingress) LSR of an MPLS tunnel inserts an Entropy Label Indicator (ELI) and an entropy label (Entropy Label) into an MPLS label stack (Label Stack), where the ELI is a reserved label, and a value of the label is 7, indicating that an MPLS label following the ELI is an EL. In this case, when an MPLS packet that carries the foregoing ELI and EL passes through a transit (Transit) LSR, the Transit LSR can obtain the EL, perform hash (Hash) processing on the EL, and perform load balancing processing on the MPLS packet based on a Hash result. In an SR network, the Ingress LSR of the MPLS tunnel cannot determine whether an egress (Egress) LSR of the MPLS tunnel has Entropy Label Capability (ELC), therefore, the SR network does not support the EL technology and the Transit LSR cannot use the EL technology to implement load balancing for forwarding of the MPLS packet.

SUMMARY

Embodiments of the present invention provide a packet processing method and an LSR, which help resolve a problem in the prior art that an SR network does not support an EL technology.

According to a first aspect, a method of receiving an entropy label capability is provided, where the method is applicable to an SR network, and the method includes: receiving, by a first node, a notification packet that is based on an Interior Gateway Protocol (IGP) and is flooded by a second node, wherein the notification packet is generated by the second node, the notification packet comprises a entropy label capability (ELC) flag, the first ELC flag is used to indicate that the second node has ELC.

According to a second aspect, a method of sending an entropy label capability is provided, where the method is applicable to an SR network, and the method includes: flooding, by the second node, a notification packet that is based on an Interior Gateway Protocol (IGP), wherein the notification packet comprises an entropy label capability (ELC) flag, and wherein the ELC flag is used to indicate that the second node has EL.

According to a third aspect, an first node is provided, where the first node is applicable to an SR network, and the first node includes a receiver, configured to receive a notification packet that is based on an Interior Gateway Protocol (IGP) and is flooded by a second node, wherein the notification packet is generated by the second node, the notification packet comprises a entropy label capability (ELC) flag, the first ELC flag is used to indicate that the second node has ELC.

According to a fourth aspect, an second node is provided, where the second node is applicable to an SR network, and the second node includes a sender, configured to flood a notification packet that is based on an Interior Gateway Protocol (IGP), wherein the notification packet comprises an entropy label capability (ELC) flag, and wherein the ELC flag is used to indicate that the second node has ELC.

In the foregoing technical solutions, the ELC can be obtained in the SR network, which helps implement an EL technology in the SR network

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
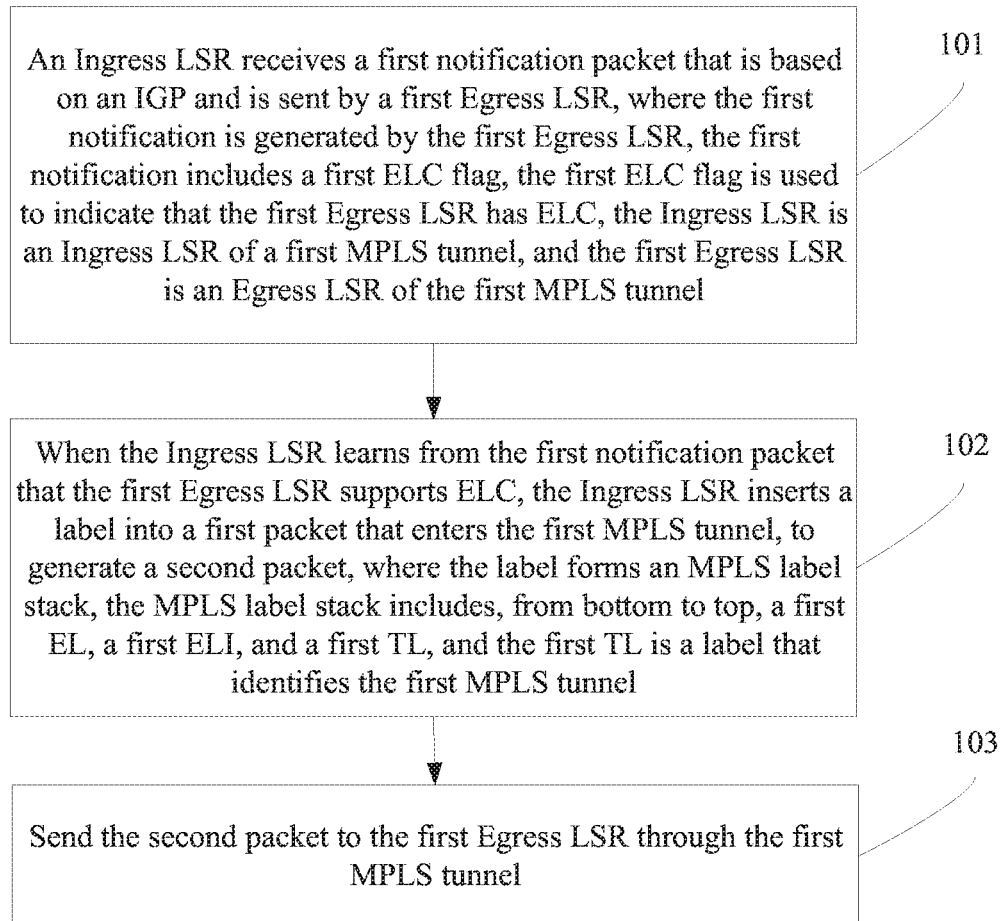
FIG. 1 is a schematic flowchart of a packet processing method according to an embodiment of the present invention.

Referring to FIG. 1, an embodiment of the present invention provides a packet processing method, where the method is applicable to an SR network, and the method includes the following steps

101. An Ingress LSR receives a first notification packet that is based on an IGP and is sent by a first Egress LSR, where the first notification packet is generated by the first Egress LSR, the first notification packet includes a first ELC flag, the first ELC flag is used to indicate that the first Egress LSR has ELC, the Ingress LSR is an Ingress LSR of a first MPLS tunnel, and the first Egress LSR is an Egress LSR of the first MPLS tunnel.

102. When the Ingress LSR learns from the first notification packet that the first Egress LSR has ELC, the Ingress LSR inserts a label into a first packet that enters the first MPLS tunnel, to generate a second packet, where the label forms an MPLS label stack, the MPLS label stack includes, from bottom to top, a first EL, a first ELI, and a first TL, the first TL is a label that identifies the first MPLS tunnel, and the first TL is allocated by the first Egress LSR in the first MPLS tunnel.

103. Send the second packet to the first Egress LSR through the first MPLS tunnel.

Figure 2:
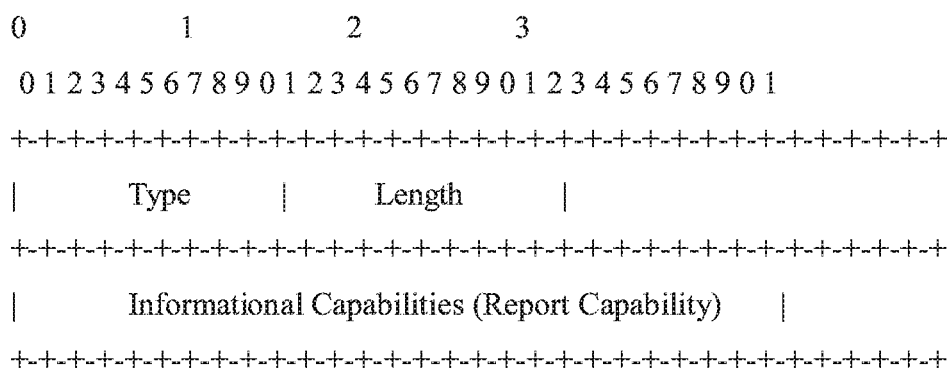
FIG. 2 is a schematic diagram of a format of an OSPF Router Informational Capabilities TLV.

Optionally, when a neighbor relationship is established between network nodes in the SR network by using OSPF, the first notification packet is an OSPF Router Information LSA that includes an OSPF Router Informational Capabilities TLV. For a format of the OSPF Router Information LSA, refer to RFC 4970 released by the Internet Engineering Task Force (Internet Engineering Task Force, IETF). Referring to FIG. 2, FIG. 2 is a schematic diagram of a format of the OSPF Router Informational Capabilities TLV. The first ELC flag is carried in an Informational Capabilities (Informational Capabilities) field of the OSPF Router Informational Capabilities TLV, and one unused bit of the Informational Capability field is allocated to carry the first ELC flag.

Optionally, when a neighbor relationship is established between network nodes in the SR network by running IS-IS, the first notification packet is an IS-IS LSP that includes an ELC Sub-TLV, and the ELC Sub-TLV is added to an IS-IS Router Capability TLV in the LSP to carry the first ELC flag. For a definition of the IS-IS Router Capability TLV, refer to RFC 4971 released by the IETF, and for a format of the ELC Sub-TLV, refer to FIG. 3.

A Type field is used to indicate that a TLV including Type is the ELC Sub-TLV, and a value of Type is assigned by the Internet Assigned Numbers Authority (Internet Assigned Numbers Authority, IANA).

A Length field is used to identify a length of a Value field of the ELC Sub-TLV.

The Value field is used to carry the first ELC flag, where when a value of the Value field is 1, it indicates that the first Egress LSR has ELC, when the value of the Value field is 0, it indicates that the first Egress LSR does not have ELC.

Figures 3, 4:
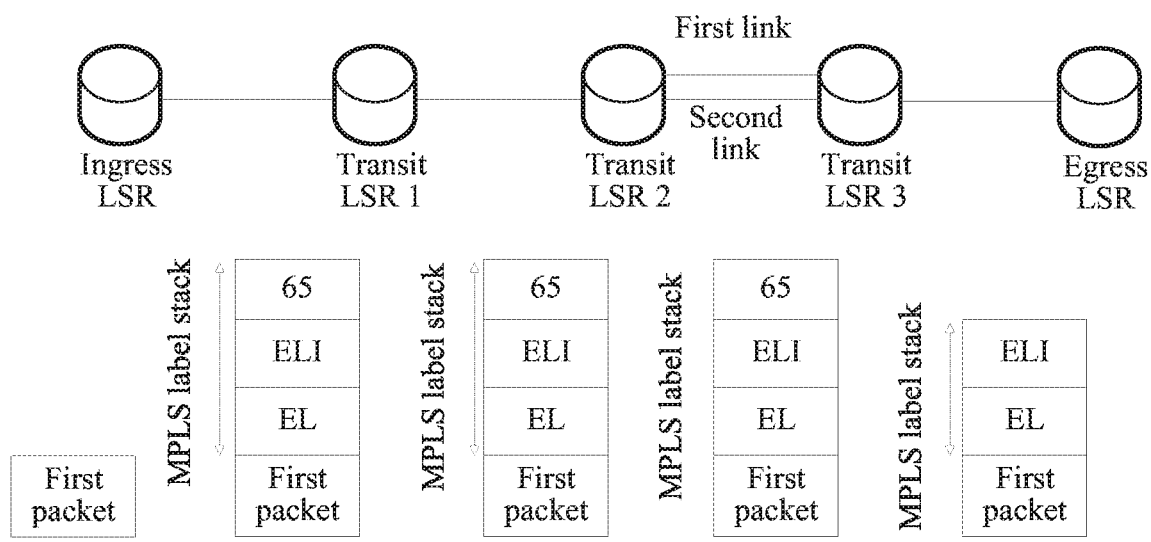
FIG. 3 is a schematic diagram of a format of an ELC Sub-TLV according to an embodiment of the present invention.
FIG. 4 is a schematic diagram of an implementation manner of a packet processing method according to an embodiment of the present invention.

Optionally, to reduce a total length of the ELC Sub-TLV, the ELC Sub-TLV shown in FIG. 3 may not include the Value field, and accordingly, a value of the Length field is 0. The Type field is further used to identify the first ELC flag, that is, when the first notification packet includes the ELC Sub-TLV, it identifies that the first Egress LSR has ELC. When the Ingress LSR receives the first notification packet and determines that the first notification packet includes the ELC Sub-TLV, it is determined that the first Egress LSR has ELC.

When receiving the second packet, a Transit LSR in the first MPLS tunnel parses the second packet to obtain the first EL, performs Hash processing on the first EL, and performs, according to a Hash result, load balancing when forwarding the second packet. Because the first Egress LSR has ELC, when the second packet arrives at the first Egress LSR, and the first Egress LSR determines that a topmost label of the MPLS label stack is the first ELI, the first Egress LSR pops up the first EL and the first ELI in the MPLS label stack to generate the first packet and processes the first packet. To describe the foregoing packet processing process more clearly, an example is used for description. As shown in FIG. 4, an Ingress LSR, a Transit LSR 1, a Transit LSR 2, a Transit LSR 3, and an Egress LSR are located in the SR network, and an MPLS tunnel exists between the Ingress LSR and the Egress LSR. The Egress LSR sends a tunnel label 65 corresponding to the Egress LSR to the Transit LSR 3, the Transit LSR 2, the Transit LSR 1, and the Ingress LSR, where the tunnel label 65 is used to uniquely identify the Egress LSR in the SR network. The Egress LSR has ELC, and the Egress LSR floods the first notification packet to the SR network, where the first notification packet is used to enable the Ingress LSR to learn that the Egress LSR has ELC. A first link and a second link exist between the Transit LSR 2 and the Transit LSR 3. When receiving the first packet that enters the MPLS tunnel and determining that the Egress LSR has ELC, the Ingress LSR inserts a label into the first packet to generate a second packet, where the label forms an MPLS label stack. As shown in FIG. 4, the MPLS label stack includes, from bottom to top, an EL, an ELI, and the tunnel label 65. After receiving the second packet, the Transit LSR 2 determines that the second packet includes the EL, performs Hash processing on the EL, and selects the first link according to a Hash result, to continue to forward the second packet through the MPLS tunnel. In this way, when multiple MPLS packets enter the MPLS tunnel, the Ingress LSR inserts a different EL into each MPLS packet of the multiple MPLS packets, and the Transit LSR 2 forwards each MPLS packet of the multiple MPLS packets in the foregoing manner, so that load balancing can be implemented on the Transit LSR 2 when forwarding the multiple MPLS packets. After receiving the second packet, the Transit LSR 3 pops up the tunnel label 65, and then forwards, to the Egress LSR, the second packet obtained after the tunnel label 65 is popped up. Because the Egress LSR has ELC, after receiving the second packet obtained after the tunnel label 65 is popped up, and when determining that a topmost label of the MPLS label stack is the ELI, the Egress LSR pops up the ELI and the EL to restore the first packet and continues to process the first packet. In this way, an EL technology can be implemented in the SR network.

Optionally, if the first MPLS tunnel traverses a second MPLS tunnel, the method further includes receiving, by the Ingress LSR, a second notification packet that is based on an IGP and is flooded by a second Egress LSR, where the second notification packet includes a second ELC flag, the second ELC flag is used to indicate that the second Egress LSR has ELC, the second Egress LSR is an Egress LSR of the second MPLS tunnel, the MPLS label stack further includes a second TL above the first TL, the second TL is a label that identifies the second MPLS tunnel, and the second TL is allocated by the second Egress LSR in the second MPLS tunnel, and when the Ingress LSR determines that the MPLS label stack has already included the first EL, omitting to insert a second EL and a second ELI between the first TL and the second TL in the MPLS label stack. Because inserting the second EL and the second ELI into the MPLS label stack is omitted, a depth of the MPLS label stack can be effectively reduced, thereby reducing a total length of the second packet and avoiding excessive occupation of network bandwidth.

Optionally, when a neighbor relationship is established between network nodes in the SR network by using OSPF, the second notification packet is an OSPF Router Information LSA that includes an OSPF Router Informational Capabilities TLV. Referring to FIG. 2, FIG. 2 is a schematic diagram of a format of the OSPF Router Informational Capabilities TLV. The second ELC flag is carried by using an Informational Capabilities field of the OSPF Router Informational Capabilities TLV, and an unused bit in Bits of the Informational Capability is allocated to carry the second ELC flag.

Optionally, when a neighbor relationship is established between network nodes in the SR network by running IS-IS, the second notification packet is an IS-IS LSP that includes an ELC Sub-TLV, and the ELC Sub-TLV is added to an IS-IS Router Capability TLV in the LSP to carry the second ELC flag. For a format of the ELC Sub-TLV, refer to FIG. 3. Details are not described herein again.

Figure 5:
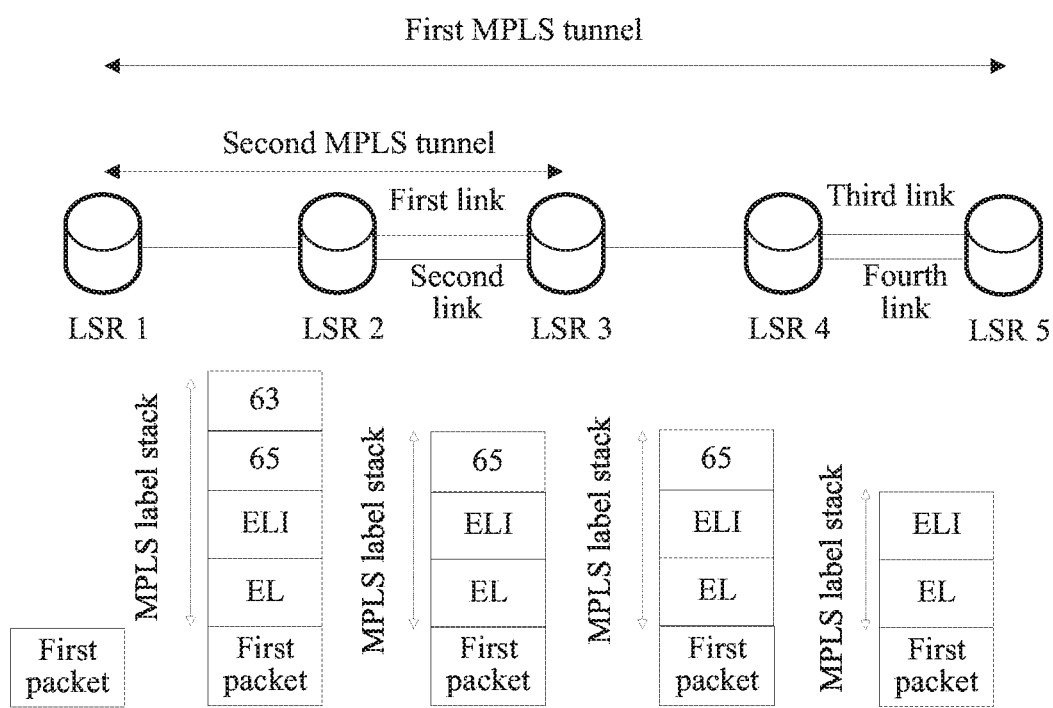
FIG. 5 is a schematic diagram of another implementation manner of a packet processing method according to an embodiment of the present invention.

To describe the foregoing packet processing process more clearly, an example is used for description. As shown in FIG. 5, an LSR 1, an LSR 2, an LSR 3, an LSR 4, and an LSR 5 are located in the SR network, and the first MPLS tunnel is established between the LSR 1 and the LSR 5, and the second MPLS tunnel is established between the LSR 1 and the LSR 3, where the LSR 1 is an Ingress LSR of the first MPLS tunnel and the LSR 1 is also an Ingress LSR of the second MPLS. The LSR 5 sends a tunnel label 65 corresponding to the LSR 5 to the LSR 4, the LSR 3, the LSR 2, and the LSR 1, and the tunnel label 65 is used to uniquely identify the LSR 5 in the SR network. The LSR 3 sends a tunnel label 63 corresponding to the LSR 3 to the LSR 2 and the LSR 1, and the tunnel label 63 is used to uniquely identify the LSR 3 in the SR network. The LSR 5 has ELC, and the LSR 5 floods the first notification packet to the SR network, where the first notification packet is used to enable the LSR 1 to learn that the LSR 5 has ELC. The LSR 3 also has ELC, and the LSR 3 floods the second notification packet to the SR network, where the second notification packet is used to enable the LSR 1 to learn that the LSR 3 has ELC. A first link and a second link exist between the LSR 2 and the LSR 3, and a third link and a fourth link exist between the LSR 4 and the LSR 5. When receiving the first packet sent to the LSR 5, and determining that the first packet needs to pass through the first MPLS tunnel and the LSR 5 has ELC, the LSR 1 inserts a label into the first packet to generate a second packet, where the label forms an MPLS label stack. As shown in FIG. 5, the MPLS label stack includes, from bottom to top, an EL, an ELI, and the tunnel label 65. When determining that the first MPLS tunnel needs to traverse the second MPLS tunnel, the LSR 1 inserts the tunnel label 63 corresponding to the LSR 3 into a top of the MPLS label stack, and omits to insert a second EL and a second ELI between the tunnel label 65 and the tunnel label 63. When a Transit LSR in the second MPLS tunnel, for example, the LSR 2, receives the second packet, the LSR 2 can perform, according to the EL, load balancing when forwarding the second packet. Because inserting the second EL and the second ELI between the tunnel label 65 and the tunnel label 63 is omitted, a depth of the MPLS label stack can be effectively reduced, thereby reducing a total length of the second packet and avoiding excessive occupation of network bandwidth. After receiving the second packet and determining that the LSR 2 is a direct upstream LSR of the LSR 3, the LSR 2 pops up the tunnel label 63 in the MPLS label stack of the second packet to generate a third packet. After determining that the third packet includes the EL, the LSR 2 performs Hash processing on the EL, and selects the first link according to a Hash result to continue to forward the third packet through the second MPLS tunnel. After receiving the third packet and determining that the LSR 4 is a direct upstream LSR of the LSR 5, the LSR 4 pops up the tunnel label 65 in the MPLS label stack of the third packet to generate a fourth packet. After determining that the fourth packet includes the EL, the LSR 4 performs Hash processing on the EL, and selects the third link according to a Hash result to continue to forward the fourth packet through the first MPLS tunnel. In this way, when multiple MPLS packets enter the first MPLS tunnel, the LSR 1 separately inserts a different EL into each MPLS packet of the multiple MPLS packets, so that the LSR 2 and the LSR 4 can implement load balancing when forwarding the multiple MPLS packets. Because the LSR 5 has ELC, when receiving the fourth packet and determining that the topmost label of the MPLS label stack is the ELI, the LSR 5 pops up the ELI and the EL to restore the first packet, and then continues to process the first packet. In this way, an EL technology can be implemented in the SR network.

In the foregoing technical solution, by receiving a first notification packet generated by a first Egress LSR, an Ingress LSR can learn that the first Egress LSR has ELC, and then insert a first EL, a first ELI, and a first TL label into a first packet that enters a first MPLS tunnel, to generate a second packet. In this way, a Transit LSR of the first MPLS tunnel can perform, according to the first EL, load balancing when forwarding the second packet. When receiving the second packet and determining that a topmost label of a first MPLS label stack is the ELI, the first Egress LSR pops up the ELI and the EL to restore the first packet and continues to process the first packet, so that an EL technology can be implemented in an SR network.

Figure 6:
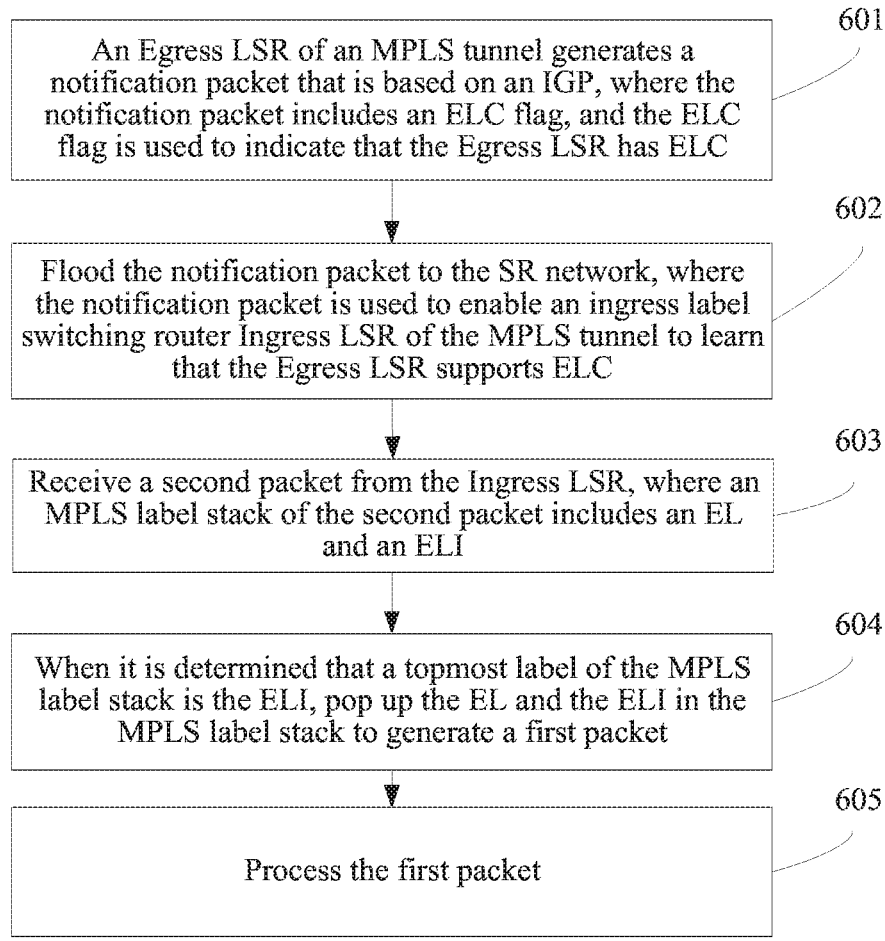
FIG. 6 is a schematic flowchart of a packet processing method according to an embodiment of the present invention.

Referring to FIG. 6, an embodiment provides a packet processing method, where the method is applicable to an SR network, and the method includes the following steps.

601. An Egress LSR of an MPLS tunnel generates a notification packet that is based on an IGP, where the notification packet includes an ELC flag, and the ELC flag is used to indicate that the Egress LSR has ELC.

602. Flood the notification packet to the SR network, where the notification packet is used to enable an Ingress LSR of the MPLS tunnel to learn that the Egress LSR has ELC.

603. Receive a second packet from the Ingress LSR, where an MPLS label stack of the second packet includes an EL and an ELI.

604. When it is determined that a topmost label of the MPLS label stack is the ELI, pop up the EL and the ELI in the MPLS label stack to generate a first packet.

605. Process the first packet.

Optionally, when a neighbor relationship is established between network nodes in the SR network by using OSPF, the notification packet is an OSPF Router Information LSA that includes an OSPF Router Informational Capabilities TLV. Referring to FIG. 2, FIG. 2 is a schematic diagram of a format of the OSPF Router Informational Capabilities TLV. The ELC flag is carried by using an Informational Capabilities field of the OSPF Router Informational Capabilities TLV, and an unused Bit in Bits of the Informational Capability is allocated and used as the ELC flag.

Optionally, when a neighbor relationship is established between network nodes in the SR network by running IS-IS, the first notification packet is an IS-IS LSP that includes an ELC Sub-TLV, and the ELC Sub-TLV is added to an IS-IS Router Capability TLV in the LSP to carry the ELC flag. For a format of the ELC Sub-TLV, refer to FIG. 3. The ELC Sub-TLV is described in detail in the packet processing method in FIG. 1, and details are not described herein again.

When the Ingress LSR determines that the Egress LSR has ELC, the Ingress LSR inserts the EL and the ELI into the first packet that enters the MPLS tunnel, to generate a second packet. When receiving the second packet, a Transit LSR in the MPLS tunnel parses the second packet to obtain the EL, performs Hash processing on the EL, and performs, according to a Hash result, load balancing when forwarding the second packet. Because the Egress LSR has ELC, when the second packet arrives at the Egress LSR, and the Egress LSR determines that the topmost label of the MPLS label stack is the ELI, the Egress LSR pops up the ELI and the EL to restore the first packet and continues to process the first packet.

Optionally, the processing the first packet specifically includes when the MPLS label stack in a packet header of the first packet further includes a label corresponding to another LSR, performing forwarding according to the label of the another LSR, or when a packet header of the first packet does not include a label of another LSR, and a destination address in the packet header of the first packet is an address of the Egress LSR, performing corresponding processing on the first packet according to a payload of the first packet, or when a packet header of the first packet does not include a label of another LSR, and a destination address in the packet header of the first packet is not an address of the Egress LSR, performing forwarding according to the destination address.

According to the technical solution provided in this embodiment of the present invention, an Egress LSR generates a notification packet that includes an ELC flag, and sends the notification packet to an Ingress LSR of an MPLS tunnel. In this way, the Ingress LSR can determine that the Egress LSR has ELC, further, the Ingress LSR inserts an EL and an ELI into a first packet that enters the MPLS tunnel, to generate a second packet. A Transit LSR of the MPLS tunnel can perform, according to the EL, load balancing when forwarding the second packet. When receiving the second packet and determining that a topmost label of an MPLS label stack is the ELI, the Egress LSR pops up the ELI and the EL to restore the first packet and continues to process the first packet, so that an EL technology can be implemented in an SR network.

Figure 7:
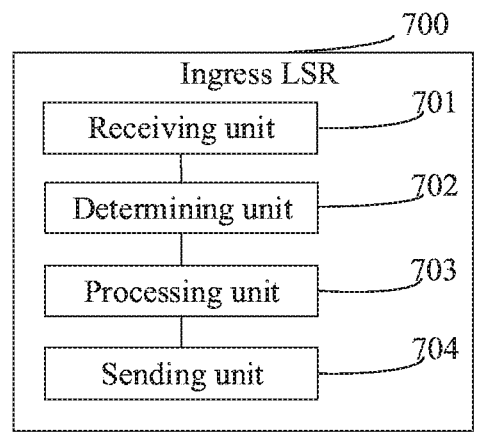
FIG. 7 is a schematic structural diagram of an LSR according to an embodiment of the present invention.

Referring to FIG. 7, an embodiment of the present invention provides an LSR 700, where the LSR 700 is applicable to an SR network, the LSR 700 is an Ingress LSR of a first MPLS tunnel, and the LSR 700 includes a receiving unit 701, configured to receive a first notification packet that is based on an IGP and is generated by a first Egress LSR, where the first notification packet includes a first ELC flag, the first ELC flag is used to indicate that the first Egress LSR has ELC, and the first Egress LSR is an Egress LSR of the first MPLS tunnel, a determining unit 702, configured to determine whether the first Egress LSR has ELC according to the first notification packet received by the receiving unit 701, a processing unit 703, configured to when the determining unit 702 determines that the first Egress LSR has ELC, insert a label into a first packet that enters the first MPLS tunnel, to generate a second packet, where the label forms an MPLS label stack, the MPLS label stack includes, from bottom to top, a first EL, a first ELI, and a first TL, the first TL is a label that identifies the first MPLS tunnel, and the first TL is allocated by the first Egress LSR in the first MPLS tunnel, and a sending unit 704, configured to send, through the first MPLS tunnel to the first Egress LSR, the second packet generated by the processing unit 703.

Optionally, when a neighbor relationship is established between network nodes in the SR network by using OSPF, the first notification packet is an OSPF Router Information LSA that includes an OSPF Router Informational Capabilities TLV. Referring to FIG. 2, FIG. 2 is a schematic diagram of a format of the OSPF Router Informational Capabilities TLV. The first ELC flag is carried by using an Informational Capabilities field of the OSPF Router Informational Capabilities TLV, and an unused bit in Bits of the Informational Capability is allocated to carry the first ELC flag.

Optionally, when a neighbor relationship is established between network nodes in the SR network by running IS-IS, the notification packet is an IS-IS LSP that includes an ELC Sub-TLV, and the ELC Sub-TLV is added to an IS-IS Router Capability TLV in the LSP to carry the first ELC flag. For a format of the ELC Sub-TLV, refer to FIG. 3. The ELC Sub-TLV is described in detail in the packet processing method in FIG. 1, and details are not described herein again.

When receiving the second packet, a Transit LSR in the first MPLS tunnel parses the second packet to obtain the first EL, performs Hash processing on the first EL, and performs, according to a Hash result, load balancing when forwarding the second packet. Because the first Egress LSR has ELC, when the second packet arrives at the first Egress LSR, and the first Egress LSR determines that a topmost label of the MPLS label stack is the first ELI, the first Egress LSR pops up the first EL and the first ELI in the MPLS label stack to restore the first packet and continues to process the first packet.

Optionally, when the first MPLS tunnel traverses a second MPLS tunnel, the receiving unit 701 is further configured to receive a second notification packet that is based on an IGP and is flooded by a second Egress LSR, where the second notification packet includes a second ELC flag, the second ELC flag is used to indicate that the second Egress LSR has ELC, the second Egress LSR is an Egress LSR of the second MPLS tunnel, the MPLS label stack further includes a second TL above the first TL, the second TL is a label that identifies the second MPLS tunnel, and the second TL is allocated by the second Egress LSR in the second MPLS tunnel.

The processing unit 703 is further configured to when it is determined that the MPLS label stack has already included the first EL, omit to insert a second EL and a second ELI between the first TL and the second TL in the MPLS label stack. When performing MPLS forwarding, a Transit LSR in the second MPLS tunnel may perform, according to the first EL, load balancing during forwarding. Because inserting the second EL and the second ELI between the first TL and the second TL is omitted, a depth of the MPLS label stack can be effectively reduced, thereby reducing a total length of the second packet and avoiding excessive occupation of network bandwidth.

According to the technical solution provided in this embodiment of the present invention, by receiving a first notification packet generated by a first Egress LSR, an LSR 700 can learn that the first Egress LSR has ELC, and further insert a first EL, a first ELI, and a first TL label into a first packet that enters a first MPLS tunnel, to generate a second packet. In this way, a Transit LSR of the first MPLS tunnel can perform, according to the first EL, load balancing when forwarding the second packet. When receiving the second packet and determining that a topmost label of a first MPLS label stack is the ELI, the first Egress LSR pops up the ELI and the EL to restore the first packet and continues to process the first packet, so that an EL technology can be implemented in an SR network.

Figure 8:
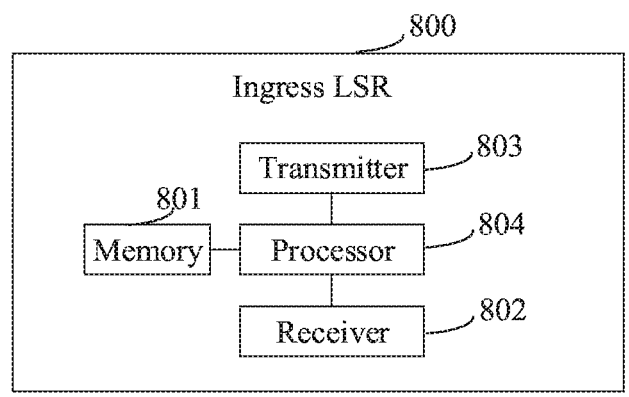
FIG. 8 is a schematic structural diagram of an LSR according to an embodiment of the present invention.

Referring to FIG. 8, an embodiment of the present invention provides an LSR 800, where the LSR 800 is applicable to an SR network, the LSR 800 is an Ingress LSR of an MPLS tunnel, and the LSR 800 includes a memory 801, a receiver 802, and a transmitter 803, and a processor 804 that is separately connected to the memory 801, the receiver 802, and the transmitter 803, where the memory 801 is configured to store a group of program instructions, and the processor 804 is configured to invoke the program instructions stored in the memory 801 to perform the following operations, including triggering the receiver 802 to receive a first notification packet that is based on an IGP and is generated by a first Egress LSR, where the first notification packet includes a first ELC flag, the first ELC flag is used to indicate that the first Egress LSR has ELC, and the first Egress LSR is an Egress LSR of the first MPLS tunnel, determining whether the first Egress LSR has ELC according to the first notification packet received by the receiver 802, after it is determined that the first Egress LSR has ELC, inserting a label into a first packet that enters the first MPLS tunnel, to generate a second packet, where the label forms an MPLS label stack, the MPLS label stack includes, from bottom to top, a first EL, a first ELI, and a first TL, and the first TL is a label corresponding to the first Egress LSR in the first MPLS tunnel, and triggering the transmitter 803 to send the second packet to the first Egress LSR through the first MPLS tunnel.

Optionally, when a neighbor relationship is established between network nodes in the SR network by using OSPF, the first notification packet is an OSPF Router Information LSA that includes an OSPF Router Informational Capabilities TLV. Referring to FIG. 2, FIG. 2 is a schematic diagram of a format of the OSPF Router Informational Capabilities TLV. The first ELC flag is carried by using an Informational Capabilities field of the OSPF Router Informational Capabilities TLV, and an unused bit in Bits of the Informational Capability is allocated and used as the first ELC flag.

Optionally, when a neighbor relationship is established between network nodes in the SR network by running IS-IS, the notification packet is an IS-IS LSP that includes an ELC Sub-TLV, and the ELC Sub-TLV is added to an IS-IS Router Capability TLV in the LSP to carry the ELC flag. For a format of the ELC Sub-TLV, refer to FIG. 3. The ELC Sub-TLV is described in detail in the packet processing method in FIG. 1, and details are not described herein again.

When receiving the second packet, a Transit LSR in the first MPLS tunnel parses the second packet to obtain the first EL, performs Hash processing on the first EL, and performs, according to a Hash result, load balancing when forwarding the second packet. Because the first Egress LSR has ELC, when the second packet arrives at the first Egress LSR, and the first Egress LSR determines that a topmost label of the MPLS label stack is the first ELI, the first Egress LSR pops up the first EL and the first ELI in the MPLS label stack to restore the first packet and continues to process the first packet.

Optionally, when the first MPLS tunnel traverses a second MPLS tunnel, the processor 804 is further configured to invoke the program instructions stored in the memory 801 to perform the following operations, including triggering the receiver 802 to receive a second notification packet that is based on an IGP and is flooded by a second Egress LSR, where the second notification packet includes a second ELC flag, the second ELC flag is used to indicate that the second Egress LSR has ELC, the second Egress LSR is an Egress LSR of the second MPLS tunnel, the MPLS label stack further includes a second TL above the first TL, and the second TL is a label in the second MPLS tunnel and corresponding to the second Egress LSR, and when it is determined that the MPLS label stack has already included the first EL, omitting to insert a second EL and a second ELI between the first TL and the second TL in the MPLS label stack.

When performing MPLS forwarding, a Transit LSR in the second MPLS tunnel may perform, according to the first EL, load balancing during forwarding. Because inserting the second EL and the second ELI between the first TL and the second TL is omitted, a depth of the MPLS label stack can be effectively reduced, thereby reducing a total length of the second packet and avoiding excessive occupation of network bandwidth.

Optionally, the processor 804 may be a Central Processing Unit (CPU), the memory 801 may be an internal memory of a random access memory (Random Access Memory, RAM) type, the receiver 802 and the transmitter 803 may include a common physical interface, and the physical interface may be an Ethernet interface or an Asynchronous Transfer Mode (ATM) interface. The processor 804, the receiver 802, the transmitter 803, and the memory 801 may be integrated into one or more independent circuits or hardware, for example, an Application Specific Integrated Circuit (ASIC).

According to the technical solution provided in this embodiment of the present invention, by receiving a first notification packet generated by a first Egress LSR, an LSR 800 can learn that the first Egress LSR has ELC, and further insert a first EL, a first ELI, and a first TL label into a first packet that enters a first MPLS tunnel, to generate a second packet. In this way, a Transit LSR of the first MPLS tunnel can perform, according to the first EL, load balancing when forwarding the second packet. When receiving the second packet and determining that a topmost label of a first MPLS label stack is the ELI, the first Egress LSR pops up the ELI and the EL to restore the first packet and continues to process the first packet, so that an EL technology can be implemented in an SR network.

Figure 9:
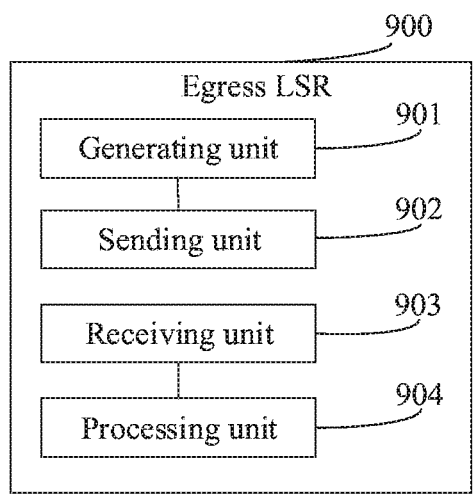
FIG. 9 is a schematic structural diagram of an LSR according to an embodiment of the present invention.

Referring to FIG. 9, an embodiment of the present invention provides an LSR 900, where the LSR 900 is applicable to an SR network, the LSR 900 is an Egress LSR of an MPLS tunnel, and the LSR 900 includes: a generating unit 901, configured to generate a notification packet that is based on an IGP, where the notification packet includes an ELC flag, and the ELC flag is used to indicate that the LSR 900 has ELC, a sending unit 902, configured to flood the notification packet generated by the generating unit 901 to the SR network, where the notification packet is used to enable an Ingress LSR of the MPLS tunnel to learn that the LSR 900 has ELC, a receiving unit 903, configured to receive a second packet from the Ingress LSR, where an MPLS label stack of the second packet includes an EL and an ELI, and a processing unit 904, configured to when it is determined that a topmost label of the MPLS label stack is the ELI, pop up the EL and the ELI in the MPLS label stack to generate a first packet, and process the first packet.

Optionally, when a neighbor relationship is established between network nodes in the SR network by using OSPF, the first notification packet is an OSPF Router Information LSA that includes an OSPF Router Informational Capabilities TLV. Referring to FIG. 2, FIG. 2 is a schematic diagram of a format of the OSPF Router Informational Capabilities TLV. The ELC flag is carried by using an Informational Capabilities field of the OSPF Router Informational Capabilities TLV, and an unused bit in Bits of the Informational Capability is allocated to carry the ELC flag.

Optionally, when a neighbor relationship is established between network nodes in the SR network by running IS-IS, the first notification packet is an IS-IS LSP that includes an ELC Sub-TLV, and the ELC Sub-TLV is added to an IS-IS Router Capability TLV in the LSP to carry the ELC flag. For a format of the ELC Sub-TLV, refer to FIG. 3. Details are not described herein again.

When the Ingress LSR determines that the LSR 900 has ELC, the Ingress LSR inserts the EL and the ELI into the first packet that enters the MPLS tunnel, to generate the second packet. When receiving the second packet, a Transit LSR in the MPLS tunnel parses the second packet to obtain the EL, performs Hash processing on the EL, and performs, according to a Hash result, load balancing when forwarding the second packet. Because the LSR 900 has ELC, when the second packet arrives at the LSR 900, and the LSR 900 determines that the topmost label of the MPLS label stack is the ELI, the LSR 900 pops up the ELI and the EL to restore the first packet and continues to forward the first packet.

According to the technical solution provided in this embodiment of the present invention, an LSR 900 generates a notification packet that includes an ELC flag, and sends the notification packet to an Ingress LSR of an MPLS tunnel. In this way, the Ingress LSR can determine that the LSR 900 has ELC, further, the Ingress LSR inserts an EL and an ELI into a first packet that enters an MPLS tunnel, to generate a second packet. A Transit LSR of the MPLS tunnel can perform, according to the EL, load balancing when forwarding the second packet. When receiving the second packet and determining that a topmost label of an MPLS label stack is the ELI, the LSR 900 pops up the ELI and the EL to restore the first packet and continues to process the first packet, so that an EL technology can be implemented in an SR network.

Figure 10:
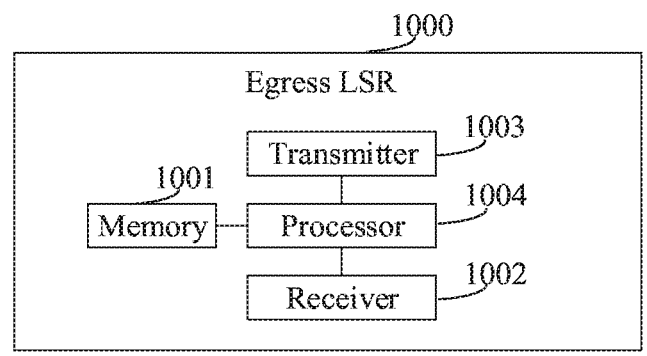
FIG. 10 is a schematic structural diagram of an LSR according to an embodiment of the present invention.

Referring to FIG. 10, an embodiment of the present invention provides an LSR 1000, where the LSR 1000 is applicable to an SR network, the LSR 1000 is an Egress LSR of an MPLS tunnel, and the LSR 1000 includes a memory 1001, a receiver 1002, and a transmitter 1003, and a processor 1004 that is separately connected to the memory 1001, the receiver 1002, and the transmitter 1003, where the memory 1001 is configured to store a group of program instructions, and the processor 1004 is configured to invoke the program instructions stored in the memory 1001 to perform the following operations generating a notification packet that is based on an IGP, where the notification packet includes an ELC flag, and the ELC flag is used to indicate that the LSR 1000 has ELC, triggering the transmitter 1003 to flood the notification packet generated by the processor 1004 to the SR network, where the notification packet is used to enable an Ingress LSR of the MPLS tunnel to learn that the LSR 1000 has ELC, triggering the receiver 1002 to receive a second packet from the Ingress LSR, where an MPLS label stack of the second packet includes an EL and an ELI, and when it is determined that a topmost label of the MPLS label stack is the ELI, popping up the EL and the ELI in the MPLS label stack to generate a first packet, and processing the first packet.

Optionally, when a neighbor relationship is established between network nodes in the SR network by using OSPF, the first notification packet is an OSPF Router Information LSA that includes an OSPF Router Informational Capabilities TLV. Referring to FIG. 2, FIG. 2 is a schematic diagram of a format of the OSPF Router Informational Capabilities TLV. The ELC flag is carried by using an Informational Capabilities field of the OSPF Router Informational Capabilities TLV, and an unused Bit in Bits of the Informational Capability is allocated and used as the ELC flag.

Optionally, when a neighbor relationship is established between network nodes in the SR network by running IS-IS, the first notification packet is an IS-IS LSP that includes an ELC Sub-TLV, and the ELC Sub-TLV is added to an IS-IS Router Capability TLV in the LSP to carry the ELC flag. For a format of the ELC Sub-TLV, refer to FIG. 3. The ELC Sub-TLV is described in detail in the packet processing method in FIG. 1, and details are not described herein again.

When the Ingress LSR determines that the LSR 1000 has ELC, the Ingress LSR inserts the EL and the ELI into the first packet that enters the MPLS tunnel, to generate a second packet. When receiving the second packet, a Transit LSR in the MPLS tunnel parses the second packet to obtain the EL, performs Hash processing on the EL, and performs, according to a Hash result, load balancing when forwarding the second packet. Because the LSR 1000 has ELC, when the second packet arrives at the LSR 1000, and the LSR 1000 determines that the topmost label of the MPLS label stack is the ELI, the LSR 1000 pops up the ELI and the EL to restore the first packet and continues to process the first packet.

Optionally, the processor 1004 may be a CPU, the memory 1001 may be an internal memory of a RAM type, the receiver 1002 and the transmitter 1003 may include a common physical interface, and the physical interface may be an Ethernet interface or an ATM interface. The processor 1004, the receiver 1002, the transmitter 1003, and the memory 1001 may be integrated into one or more independent circuits or hardware, for example, an ASIC.

According to the technical solution provided in this embodiment of the present invention, an LSR 1000 generates a notification packet that includes an ELC flag and sends the notification packet to an Ingress LSR of an MPLS tunnel. In this way, the Ingress LSR can determine that the LSR 1000 has ELC, further, the Ingress LSR inserts an EL and an ELI into a first packet that enters the MPLS tunnel, to generate a second packet. A Transit LSR of the MPLS tunnel can perform, according to the EL, load balancing when forwarding the second packet. When receiving the second packet and determining that a topmost label of an MPLS label stack is the ELI, the LSR 1000 pops up the ELI and the EL to restore the first packet and continues to performing process on the first packet, so that an EL technology can be implemented in an SR network.

In the embodiments of the present invention, the word "first" in a first MPLS tunnel, a first Egress LSR, a first TL, a first packet, and a first EL is only used as a name identifier, and does not indicate the first in a sequence. This rule is also applicable to the word "second", "third", and "fourth".

A person of ordinary skill in the art may understand that all or some of the steps of the foregoing method embodiments may be implemented by program instructing related hardware. The program may be stored in a computer readable storage medium. When the program runs, the steps of the foregoing method embodiments are performed. The foregoing storage medium may be at least one of the following mediums any medium that can store program code, such as a read-only memory (ROM), a random access memory (RAM), a magnetic disk, or an optical disc.

Finally, it should be noted that the foregoing embodiments are merely intended for exemplarily describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

What is claimed is:

1. A method, comprising:
   inserting, by an Ingress Label Switching Router (LSR) of a Segment Routing (SR) network, a label into a first packet to generate a second packet, wherein the label forms an Multiprotocol Label Switching (MPLS) label stack, wherein the MPLS label stack comprises, from bottom to top, a first entropy label (EL), a first entropy label indicator (ELI), a first tunnel label (TL), and a second TL, wherein the first TL is a label that uniquely identifies a first Egress LSR, the Ingress LSR is an Ingress LSR of a first MPLS tunnel and a second MPLS tunnel, and the first Egress LSR is an Egress LSR of the first MPLS tunnel, and wherein the second TL is a label that uniquely identifies a second Egress LSR, and the second Egress LSR is an Egress LSR of the second MPLS tunnel; and
   sending, by the Ingress LSR, the second packet to the first Egress LSR.

2. The method according to claim 1, further comprising:
   determining, by the Ingress LSR, that the second Egress LSR has Entropy Label Capability (ELC) before the inserting the label into the first packet.

3. The method according to claim 1, further comprising:
   determining, by the Ingress LSR, that the first Egress LSR has Entropy Label Capability (ELC) before the inserting the label into the first packet.

4. A method, comprising:
   receiving, by a Transit Label Switching Router (LSR) of a segment routing (SR) network, a second packet, wherein the second packet comprises a label, wherein the label forms a Multiprotocol Label Switching (MPLS) label stack, the MPLS label stack comprises, from bottom to top, a first entropy label (EL), a first entropy label indicator (ELI), and a first tunnel label (TL), wherein the first TL is a label that uniquely identifies a first Egress LSR, and the first Egress LSR is an Egress LSR of a first MPLS tunnel; and
   forwarding, by the Transit LSR, the second packet according to the first EL, wherein the first TL is popped from the second packet before the second packet is forwarded.

5. The method according to claim 4, wherein the MPLS label stack comprises, from bottom to top, the first EL, the first ELI, the first TL and a second TL, wherein the second TL is a label that uniquely identifies a second Egress LSR, and wherein the second Egress LSR is an Egress LSR of a second MPLS tunnel.

6. The method according to claim 5, wherein the second TL is popped from the second packet before the second packet is forwarded.

7. A device, comprising:
   a transmitter
   a processor; and
   a non-transitory computer-readable storage medium storing a program to be executed by the processor, the program including instructions to:
   cause the device to act as an Ingress Label Switching Router (LSR) of a first Multiprotocol Label Switching (MPLS) tunnel and a second MPLS tunnel;
   insert a label into a first packet to generate a second packet, wherein the label forms an MPLS label stack, the MPLS label stack comprises, from bottom to top, a first entropy label (EL), a first entropy label indicator (ELI), a first tunnel label (TL), and a second TL, wherein the first TL is a label that uniquely identifies a first Egress LSR, and the first Egress LSR is an Egress LSR of the first MPLS tunnel, and wherein the second TL is a label that uniquely identifies a second Egress LSR, and the second Egress LSR is an Egress LSR of the second MPLS tunnel; and
   cause the transmitter to send the second packet.

8. The device according to claim 7, wherein the program further includes instructions to determine that the first Egress LSR has Entropy Label Capability (ELC).

9. The device according to claim 7, wherein the program further includes instructions to determine that the second Egress LSR has Entropy Label Capability (ELC).

10. A device, comprising:
    a receiver, configured to receive a second packet on a Segment Routing (SR) network, wherein the second packet comprises a label, wherein the label forms an MPLS label stack, the MPLS label stack comprises, from bottom to top, a first entropy label (EL), a first entropy label indicator (ELI), and a first tunnel label (TL), wherein the first TL is a label that uniquely identifies a first Egress LSR, and the first Egress LSR is an Egress LSR of a first Multiprotocol Label Switching (MPLS) tunnel in which the device is a Transit Label Switching Router (Transit LSR);
    a transmitter, configured forward the second packet according to the first EL;
    a processor; and
    a non-transitory computer-readable storage medium storing a program to be executed by the processor, the program including instructions to:
    pop the first TL from the second packet before the second packet is forwarded.

11. The device according to claim 10, wherein the MPLS label stack comprises, from bottom to top, the first EL, the first ELI, the first TL and a second TL, wherein the first TL is a label that uniquely identifies a first Egress LSR, the second TL is a label that uniquely identifies a second Egress LSR, the first Egress LSR is an Egress LSR of a first MPLS tunnel, and the second Egress LSR is an Egress LSR of a second MPLS tunnel.

12. The device according to claim 11, wherein the program further includes instructions to:
pop the second TL from the second packet before the second packet is forwarded.

13. A method, comprising:
receiving, by a Transit Label Switching Router (LSR) of a segment routing (SR) network, a second packet, wherein the second packet comprises a label, wherein the label forms a Multiprotocol Label Switching (MPLS) label stack, the MPLS label stack comprises, from bottom to top, a first entropy label (EL), a first entropy label indicator (ELI), a first tunnel label (TL), and a second TL, wherein the first TL is a label that uniquely identifies a first Egress LSR, and the first Egress LSR is an Egress LSR of a first MPLS tunnel, wherein the second TL is a label that uniquely identifies a second Egress LSR, and wherein the second Egress LSR is an Egress LSR of a second MPLS tunnel; and
forwarding, by the Transit LSR, the second packet according to the first EL.

14. The method according to claim 13, wherein the first TL is popped from the second packet before the second packet is forwarded.

15. The method according to claim 13, wherein the second TL is popped from the second packet before the second packet is forwarded.

16. A device, comprising:
a receiver, configured to receive a second packet on a Segment Routing (SR) network, wherein the second packet comprises a label, wherein the label forms an MPLS label stack, the MPLS label stack comprises, from bottom to top, a first entropy label (EL), a first entropy label indicator (ELI), a first tunnel label (TL), and a second TL, wherein the first TL is a label that uniquely identifies a first Egress LSR, and the first Egress LSR is an Egress LSR of a first Multiprotocol Label Switching (MPLS) tunnel in which the device is a Transit Label Switching Router (Transit LSR), wherein the second TL is a label that uniquely identifies a second Egress LSR, and the second Egress LSR is an Egress LSR of a second MPLS tunnel; and
a transmitter, configured forward the second packet according to the first EL.

17. The device according to claim 16, further comprising:
a processor; and
a non-transitory computer-readable storage medium storing a program to be executed by the processor, the program including instructions to:
pop the first TL from the second packet before the second packet is forwarded.

18. The device according to claim 16, further comprising:
a processor; and
a non-transitory computer-readable storage medium storing a program to be executed by the processor, the program including instructions to:
pop the second TL from the second packet before the second packet is forwarded.

* * * * *